United States Patent
Oh et al.

(10) Patent No.: US 12,121,940 B2
(45) Date of Patent: Oct. 22, 2024

(54) CASSETTE FOR ULTRA-THIN GLASS

(71) Applicant: Samsung Display Co., LTD., Yongin-si (KR)

(72) Inventors: Jung Hoon Oh, Yongin-si (KR); Ki Taek Kim, Yongin-si (KR); Chang Min Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/312,643

(22) Filed: May 5, 2023

(65) Prior Publication Data
US 2024/0066570 A1     Feb. 29, 2024

(30) Foreign Application Priority Data
Aug. 17, 2022   (KR) .................. 10-2022-0102443

(51) Int. Cl.
| | |
|---|---|
| *A47B 81/00* | (2006.01) |
| *B08B 11/02* | (2006.01) |
| *B08B 11/04* | (2006.01) |
| *C03C 23/00* | (2006.01) |

(52) U.S. Cl.
CPC .............. *B08B 11/04* (2013.01); *A47B 81/00* (2013.01); *B08B 11/02* (2013.01); *C03C 23/0075* (2013.01)

(58) Field of Classification Search
CPC ......... B08B 11/04; B08B 11/02; A47B 81/00; C03C 23/0075; H01L 21/67313; H01L 21/67316; H01L 21/67326; H01L 21/6733
USPC ............ 211/41.14, 40, 41.18, 85.2, 120, 124
See application file for complete search history.

(56) References Cited

U.S. PATENT DOCUMENTS

| | | | | |
|---|---|---|---|---|
| 2,153,810 A | * | 4/1939 | Mercer ................... | G03D 13/04 396/642 |
| 2,867,161 A | * | 1/1959 | Padgett ................. | G03D 13/125 396/652 |
| 3,346,187 A | * | 10/1967 | Mueller .................. | B29D 23/18 239/33 |
| 3,682,083 A | * | 8/1972 | Puente ................... | G03D 13/08 118/500 |
| 3,889,815 A | * | 6/1975 | Merle ....................... | A47F 7/02 206/454 |
| 4,296,157 A | * | 10/1981 | Conti ....................... | H02G 1/08 138/156 |

(Continued)

FOREIGN PATENT DOCUMENTS

| | | |
|---|---|---|
| KR | 2000-0036292 | 7/2000 |
| KR | 10-2011-0107462 | 10/2011 |

*Primary Examiner* — Jennifer E. Novosad
(74) *Attorney, Agent, or Firm* — KILE PARK REED & HOUTTEMAN PLLC

(57) ABSTRACT

A cassette for ultra-thin glass includes a pair of plates spaced apart from and facing each other, and a plurality of supports mounted between the pair of plates and including a plurality of mounting grooves that support sides of sheets of ultra-thin glass. Each of the plurality of mounting grooves includes an inclined portion inclined toward a middle of each of the plurality of mounting grooves, and a straight portion extending from the inclined portion and having a constant width in an axial direction of the plurality of supports. A height of the straight portion in a radial direction of the plurality of supports is equal to or greater than a height of the inclined portion in the radial direction.

18 Claims, 15 Drawing Sheets

(56) References Cited

U.S. PATENT DOCUMENTS

| | | | | |
|---|---|---|---|---|
| 5,193,692 A * | 3/1993 | Farley | B65D 85/48 | 211/40 |
| 5,324,105 A * | 6/1994 | Christensen | B65D 25/10 | 206/335 |
| 5,534,074 A * | 7/1996 | Koons | C30B 25/12 | 211/41.18 |
| 5,605,239 A * | 2/1997 | DeVoursney | B65G 1/02 | 428/595 |
| 5,858,103 A * | 1/1999 | Nakajima | H01L 21/67306 | 211/41.18 |
| 5,876,165 A * | 3/1999 | Campbell | B60P 7/10 | 410/43 |
| 6,089,377 A * | 7/2000 | Shimizu | H01L 21/67313 | 211/41.18 |
| 6,176,377 B1 * | 1/2001 | Ali | A47F 7/141 | 211/41.18 |
| 6,257,420 B1 * | 7/2001 | Dardashti | G11B 33/0461 | D6/407 |
| 6,382,901 B1 * | 5/2002 | Hong | H01L 21/67326 | 414/757 |
| 7,128,509 B2 * | 10/2006 | Farley | B65D 85/48 | 410/43 |
| 7,854,324 B2 * | 12/2010 | Farley | B65D 90/004 | 206/453 |
| 7,900,311 B2 * | 3/2011 | Yudovsky | B24B 9/065 | 414/936 |
| 9,078,499 B1 * | 7/2015 | Brabec | A45C 11/16 | |
| 9,596,949 B1 * | 3/2017 | Scampoli | A47F 7/12 | |
| 11,191,603 B1 * | 12/2021 | Schor | A47B 81/00 | |
| 2004/0069732 A1 * | 4/2004 | Huang | H01L 21/6734 | 211/41.18 |
| 2010/0186180 A1 * | 7/2010 | Miller | H01L 21/67313 | 269/57 |
| 2011/0154590 A1 * | 6/2011 | Yudovsky | H01L 21/67046 | 15/77 |
| 2018/0261482 A1 * | 9/2018 | Chang | H01L 21/67316 | |
| 2019/0279891 A1 * | 9/2019 | Domsa | H01L 21/67109 | |
| 2024/0066570 A1 * | 2/2024 | Oh | C03C 23/0075 | |
| 2024/0066624 A1 * | 2/2024 | Yamauchi | H01L 21/67167 | |
| 2024/0095472 A1 * | 3/2024 | Rodgers | G06K 7/10297 | |
| 2024/0100577 A1 * | 3/2024 | Imaoka | B08B 3/10 | |

* cited by examiner

CASSETTE FOR ULTRA-THIN GLASS

CROSS-REFERENCE TO RELATED APPLICATION(S)

This application claims priority to and benefit of Korean Patent Application No. 10-2022-0102443 under 35 U.S.C. § 119, filed on Aug. 17, 2022, in the Korean Intellectual Property Office (KIPO), the entire contents of which are incorporated herein by reference.

BACKGROUND

1. Technical Field

The disclosure relates to a cassette for ultra-thin glass.

2. Description of the Related Art

In general, a glass panel for protecting a display is applied to large electronic products such as TVs and monitors as well as to small electronic products such as mobile phones, navigation systems, PDAs, and MP3 players.

Recently, with greater emphasis on the portability and design of electronic products, the size of the electronic products has been relatively reduced compared to the past, and components applied to a display have also been reduced.

Therefore, ultra-thin glass having greater strength than a conventional glass panel and having a thinner thickness of 100 μm or less is applied as a glass panel for protecting a display.

However, since the ultra-thin glass goes through many chemical processes in a manufacturing process, a cleaning process must be performed to remove chemicals and foreign substances from the glass.

Due to the thin thickness of the ultra-thin glass, the cleaning process of the ultra-thin glass is performed using a cassette that can simultaneously accommodate multiple sheets of ultra-thin glass.

SUMMARY

Aspects of the disclosure provide a cassette for reducing a defect rate when loaded sheets of ultra-thin glass are cleaned.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of the disclosure, a cassette for ultra-thin glass may include a pair of plates spaced apart from each other and facing each other, and a plurality of supports mounted between the pair of plates and including a plurality of mounting grooves that support sides of sheets of ultra-thin glass. Each of the plurality of mounting grooves may include an inclined portion inclined toward a middle of each of the plurality of mounting grooves, and a straight portion extending from the inclined portion and having a constant width in an axial direction of the plurality of support. A height of the straight portion in a radial direction of the plurality of support may be equal to or greater than a height of the inclined portion in the radial direction.

A ratio of the height of the inclined portion to the height of the straight portion may be in a range of about 3/7 to about 1.

The inclined portion may have a V shape having a first angle in a cross-sectional view, and the first angle may be in a range of about 20 degrees to about 60 degrees.

Each of the pair of plates may include coupling grooves, and the cassette may further include coupling members for connecting the plurality of supports passing through the coupling grooves to the pair of plates.

The plurality of mounting grooves may be spaced apart from each other by a same distance.

A distance between adjacent ones of the plurality of mounting grooves may be in a range of about 6 mm to about 10 mm.

Each of the plurality of mounting grooves may further include a round portion having a curvature in a center of the inclined portion.

The plurality of supports may include at least one pair of side supports disposed parallel to each other, and the at least one pair of side supports may be spaced apart from each other by a first separation distance.

The plurality of supports may further include a pair of lower supports disposed parallel to each other, and the pair of lower supports may be spaced apart from each other by a second separation distance.

The plurality of supports may be made of a fluorine-based resin.

The plurality of supports may be made of a stainless steel.

According to another aspect of the disclosure, a cassette for ultra-thin glass may include a pair of plates spaced apart from each other and facing each other, a first support mounted between the pair of plates and including a plurality of first mounting grooves that support first sides of sheets of ultra-thin glass, and a second support mounted between the pair of plates and including a plurality of second mounting grooves that support second sides of the sheets of ultra-thin glass. Each of the plurality of first mounting grooves may include a first inclined portion inclined toward a middle of the plurality of first mounting grooves, and a first straight portion extending from the first inclined portion and having a constant width in an axial direction of the first support. The plurality of second mounting grooves and the plurality of first mounting grooves may have different shapes or dimensions.

The first sides may be lower sides of the sheets of ultra-thin glass, and the second sides may be sides of the sheets of ultra-thin glass extending in a vertical direction.

A height of the first straight portion in a radial direction of the first support may be higher than a height of the first inclined portion in the radial direction.

A ratio of the height of the first inclined portion to the height of the first straight portion may be in a range of about 3/7 to about 1.

Each of the plurality of second mounting grooves may include a second inclined portion inclined toward a middle of the plurality of second mounting grooves, and a second straight portion extending from the second inclined portion and having a constant width in an axial direction of the second support. A height of the second straight portion in a radial direction of the second support may be lower than a height of the first straight portion in a radial direction of the first support.

Each of the plurality of second mounting grooves may be formed as a second inclined portion inclined toward a middle of the plurality of second mounting grooves.

The first inclined portion may have a V shape having a first angle in a cross-sectional view, and the first angle may be in a range of about 20 degrees to about 60 degrees.

The second inclined portion may have a V shape having a second angle in a cross-sectional view, and the second angle may be in a range of about 20 degrees to about 60 degrees.

The plurality of first mounting grooves may be spaced apart from each other by a first distance, the plurality of second mounting grooves may be spaced apart from each other by a second distance. The first distance and the second distance may be same.

A distance between adjacent ones of the plurality of first mounting grooves may be in a range of about 6 mm to about 10 mm.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
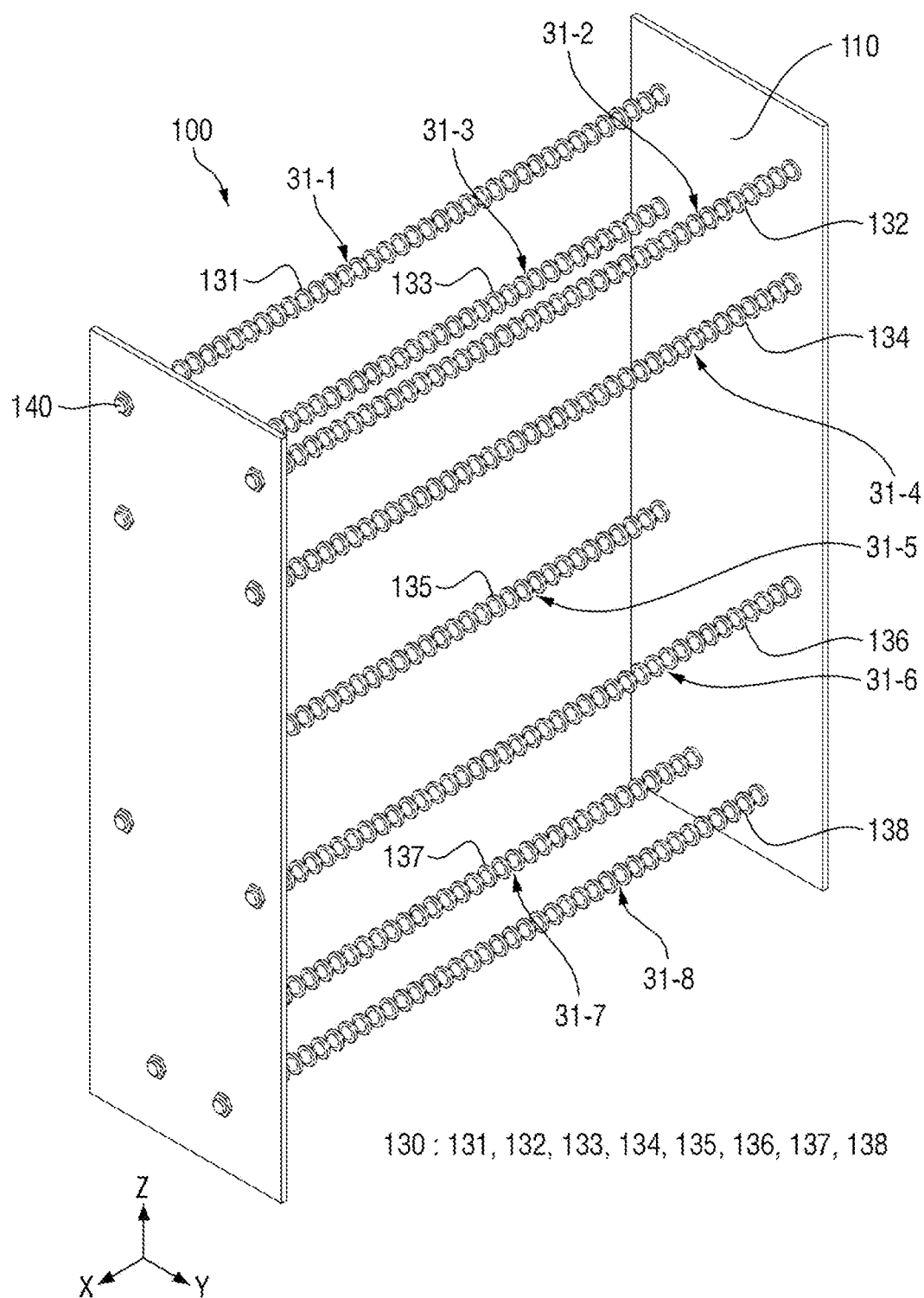
FIG. 1 is a perspective view of a cassette for ultra-thin glass according to an embodiment.

In the following description, for the purposes of explanation, numerous specific details are set forth in order to provide a thorough understanding of various embodiments or implementations of the invention. As used herein "embodiments" and "aspects" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure.

For example, specific shapes, configurations, and characteristics of an embodiment may be used or implemented in another embodiment.

When an element, such as a layer, is referred to as being "on", "connected to", or "coupled to" another element or layer, it may be directly on, connected to, or coupled to the other element or layer or intervening elements or layers may be present. When, however, an element or layer is referred to as being "directly on", "directly connected to", or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

Throughout the application, like reference numerals or symbols denote like elements. Further, in the accompanying drawings, the size and relative sizes of elements may be exaggerated for clarity and/or descriptive purposes.

Although the terms "first", "second", etc. may be used herein to describe various types of elements, these elements should not be limited by these terms. These terms are used to distinguish one element from another element. Thus, a first element discussed below could be termed a second element without departing from the teachings of the disclosure.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

Unless otherwise specified, the illustrated embodiments are to be understood as providing exemplary features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2:
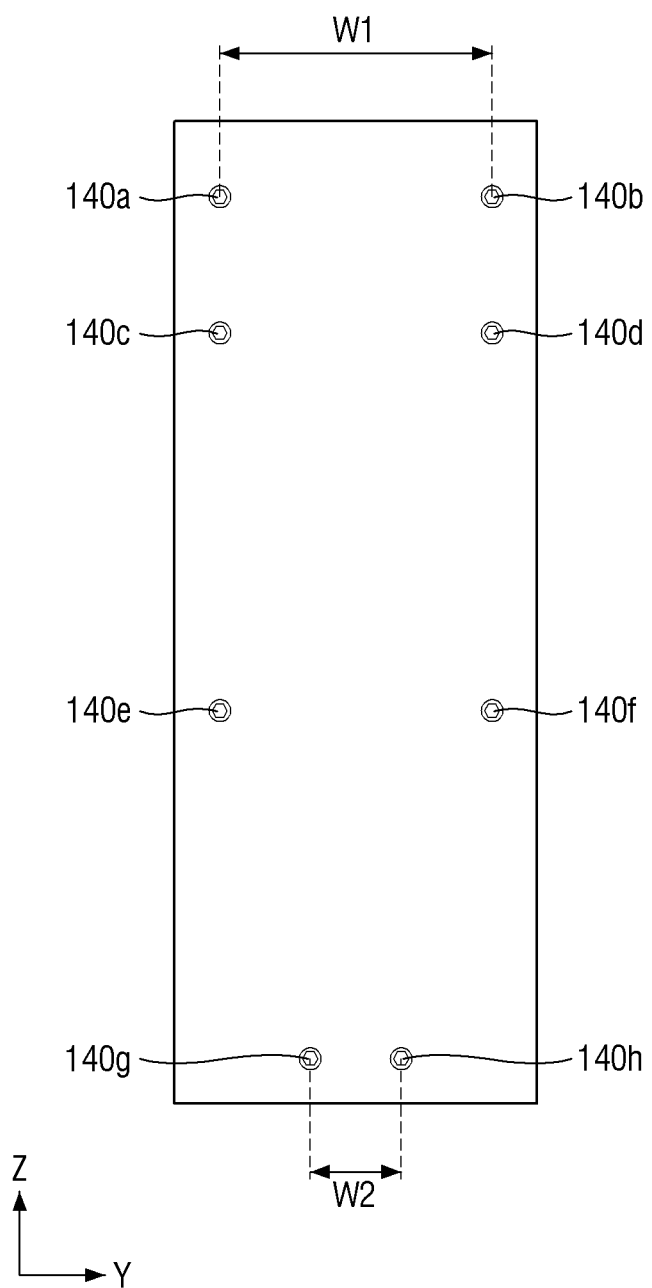
FIG. 2 is a front view of the cassette for ultra-thin glass according to an embodiment.
Figure 3:
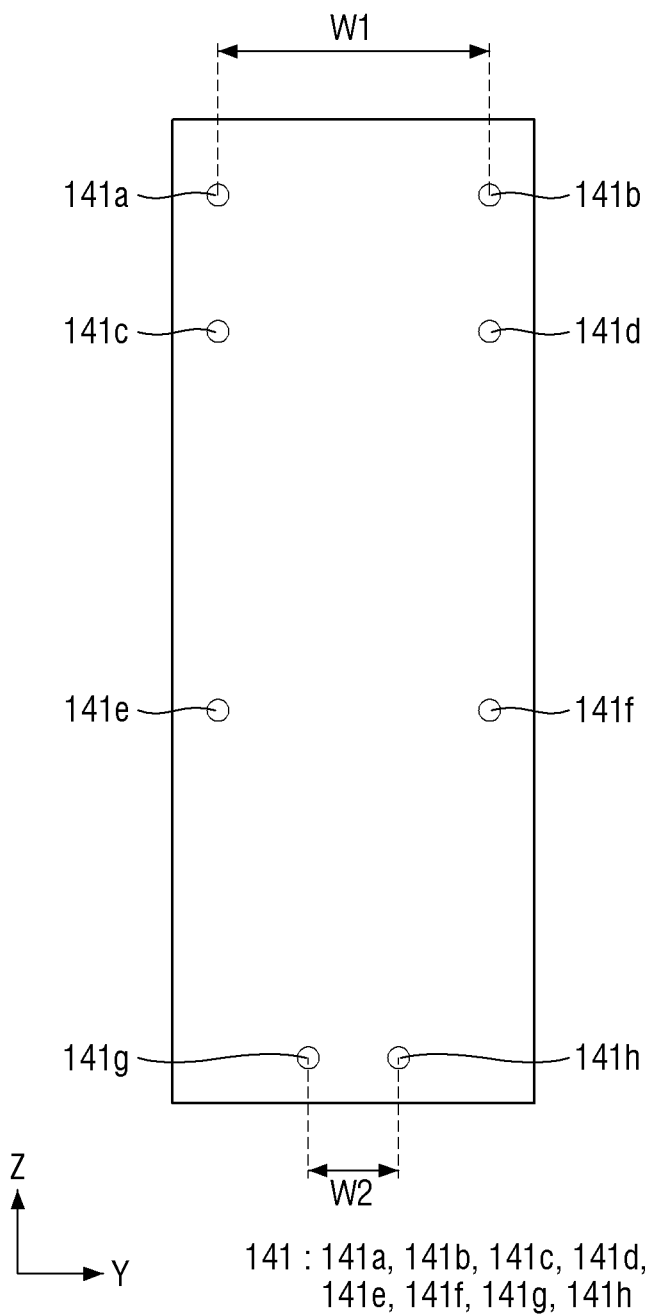
FIG. 3 is a front view of the cassette for ultra-thin glass according to an embodiment.
Figure 4:
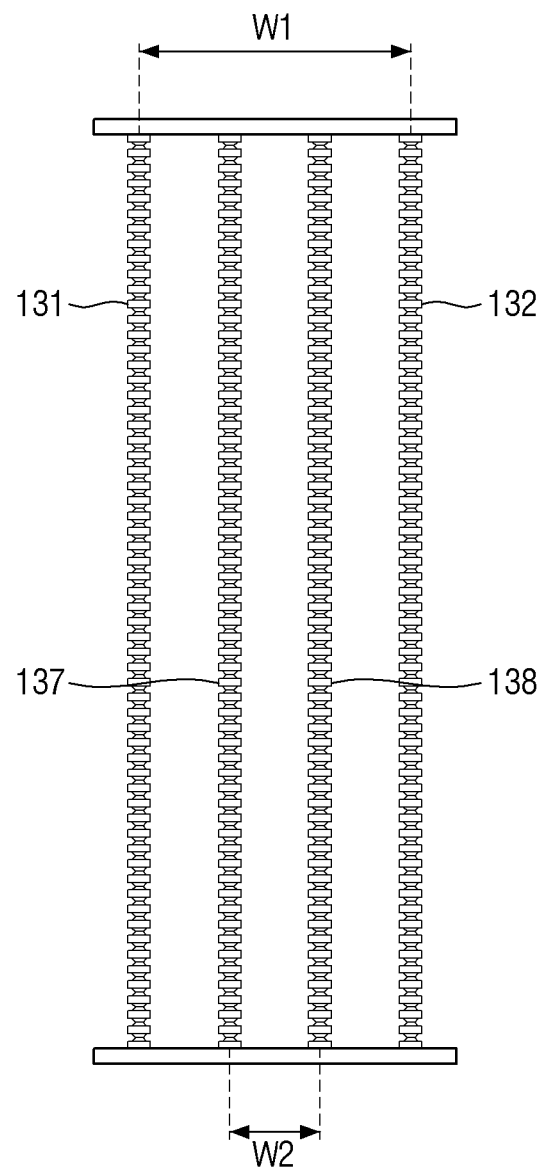
FIG. 4 is a plan view of the cassette for ultra-thin glass according to an embodiment.
Figure 5:
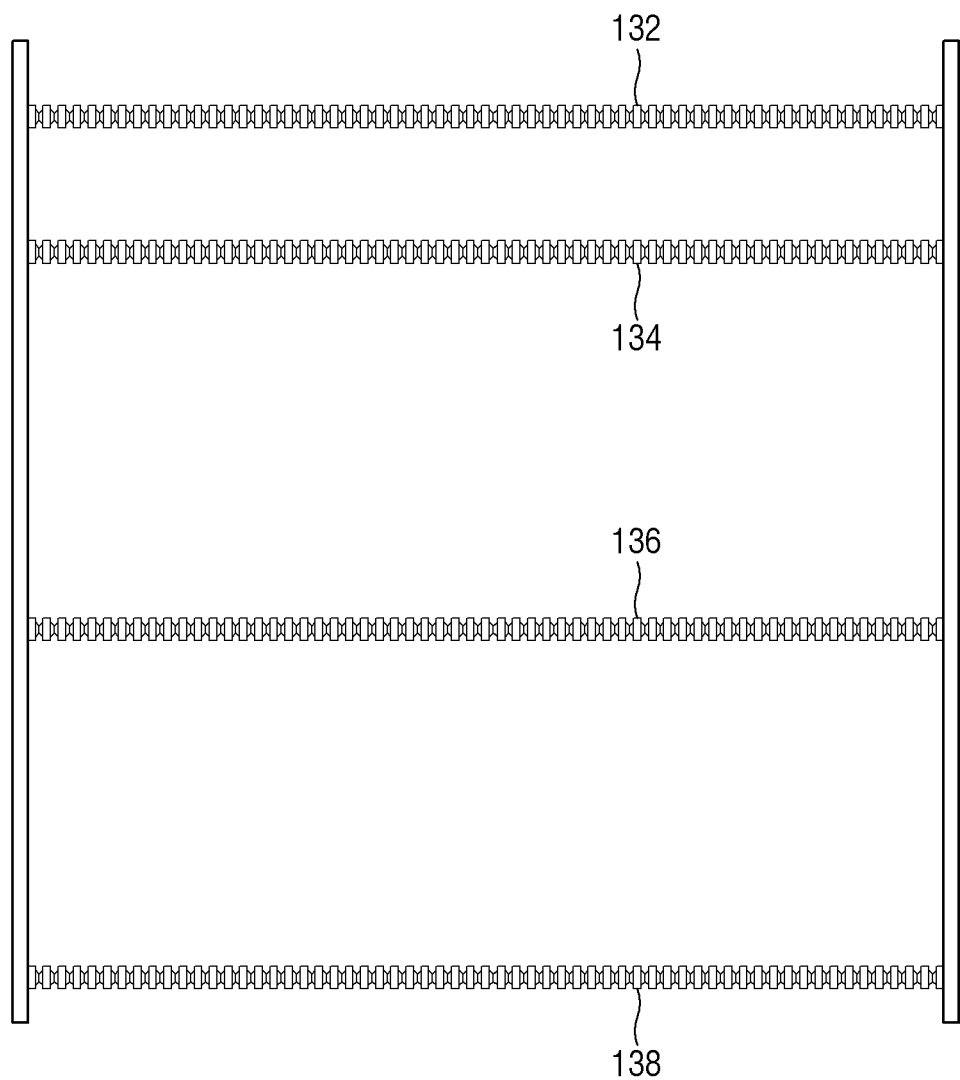
FIG. 5 is a side view of the cassette for ultra-thin glass according to an embodiment.
Figure 6:
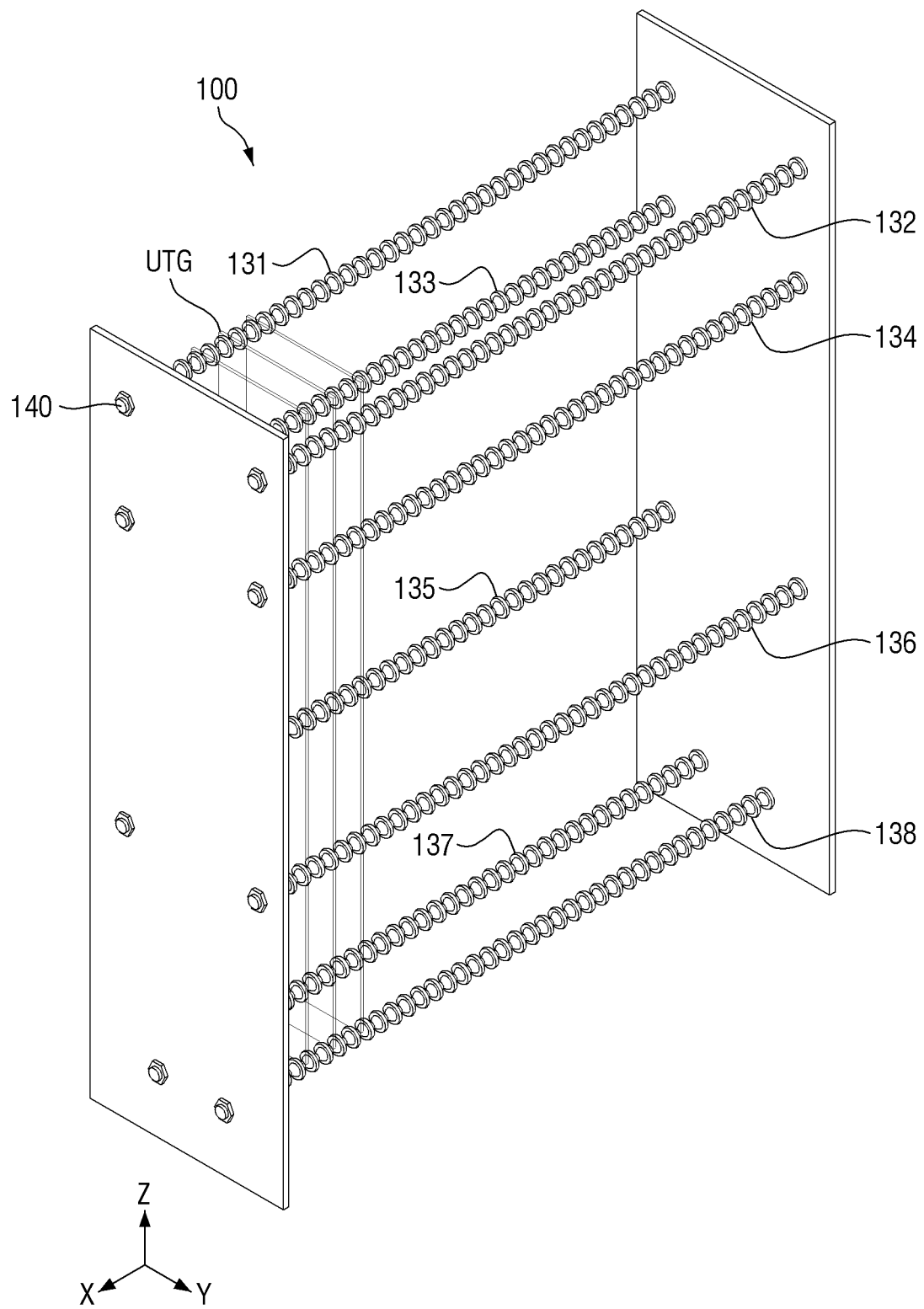
FIG. 6 is a perspective view of the cassette for supporting ultra-thin glass according to an embodiment.

FIG. 1 is a perspective view of a cassette 100 for ultra-thin glass according to an embodiment. FIG. 2 is a front view of the cassette for ultra-thin glass according to an embodiment. FIG. 3 is a front view of the cassette for ultra-thin glass according to an embodiment. FIG. 4 is a plan view of the cassette 100 for ultra-thin glass according to an embodiment. FIG. 5 is a side view of the cassette 100 for ultra-thin glass according to an embodiment. FIG. 6 is a perspective view of the cassette 100 for supporting ultra-thin glass according to an embodiment.

The cassette 100 for ultra-thin glass (UTG) according to the embodiment may be a jig that fixes dozens of sheets of ultra-thin glass during a cleaning process for manufacturing ultra-thin glass. The ultra-thin glass may be a glass which will be applied as a cover glass of various mobile electronic devices after a chemical process.

Referring to FIGS. 1 through 6, the cassette 100 for ultra-thin glass (hereinafter, referred to as the 'cassette 100') may include a pair of plates 110 and multiple supports 130. The cassette 100 may also include coupling members 140 for fixing the supports 130 to the pair of plates 110.

The plates 110 may be provided as a pair and may be spaced apart from each other by a distance to face each other. The pair of plates 110 facing each other may have a same (or symmetrical) structure and shape. The plates 110 may include coupling grooves 141. The plates 110 may be connected to each end of the supports 130 in a longitudinal direction of the supports 130 for fixing ultra-thin glass by the coupling grooves 141.

In order to facilitate the cleaning process of sheets of ultra-thin glass fixed inside the cassette 100, for example, in order to facilitate the flow of a solution, the cassette 100 may have an open structure as illustrated in the drawings, except for a minimum area for maintaining the framework and the connection relationship.

The plates 110 may be made of, but not limited to, a stainless steel.

The coupling grooves 141 provided on the pair of plates 110 may be coupled to each end of the supports 130 in the longitudinal direction (i.e., an X direction) of the supports 130 by the coupling members 140. As illustrated in FIG. 6, the supports 130 may support both sides and lower side of sheets of ultra-thin glass UTG. Therefore, the coupling grooves 141 may be formed on the plates 110 at positions corresponding to both sides and the lower side of the sheets of ultra-thin glass UTG. The coupling grooves 141 included in a plate 110 at a first end may include a first coupling groove 141a, a second coupling groove 141b, a third coupling groove 141c, a fourth coupling groove 141d, a fifth coupling groove 141e, and a sixth coupling groove 141f for supporting both sides of the sheets of ultra-thin glass UTG. In another embodiment, the third coupling groove 141c and the fourth coupling groove 141d or the fifth coupling groove 141e and the sixth coupling groove 141f may be omitted.

The first coupling groove 141a and the second coupling groove 141b may be disposed on a same Y-axis and may be spaced apart from each other by a distance corresponding to a length of each sheet of ultra-thin glass in a first direction, for example, a horizontal length of each sheet of ultra-thin glass to support both sides of each sheet of ultra-thin glass. The distance between the first coupling groove 141a and the second coupling groove 141b may be referred to as a first separation distance W1.

Similarly, the third coupling groove 141c and the fourth coupling groove 141d may be disposed on a same horizontal plane and may be spaced apart from each other by the first separation distance W1. The fifth coupling groove 141e and the sixth coupling groove 141f may be disposed on a same horizontal plane and may be spaced apart from each other by the first separation distance W1.

A plate 110 at a second end may have multiple coupling grooves disposed to face the first coupling groove 141a, the second coupling groove 141b, the third coupling groove 141c, the fourth coupling groove 141d, the fifth coupling groove 141e, and the sixth coupling groove 141f, respectively.

The coupling grooves 141 included in the plate 110 at the first end may include a seventh coupling groove 141g and an eighth coupling groove 141h for supporting the lower side of each sheet of ultra-thin glass. Since the seventh coupling groove 141g and the eighth coupling groove 141h support the lower side of each sheet of ultra-thin glass, they may be placed in consideration of a length of each sheet of ultra-thin glass in a second direction perpendicular to the first direction, for example, a vertical length of each sheet of ultra-thin glass. The seventh coupling groove 141g and the eighth coupling groove 141h may be spaced apart from each other. A distance between the seventh coupling groove 141g and the eighth coupling groove 141h may be referred to as a second separation distance W2. The second separation distance W2 may be less than the first separation distance W1. In another embodiment, the eighth coupling groove 141h may be omitted. In case that the eighth coupling groove 141h is omitted, the seventh coupling groove 141g may be provided in consideration of the length of each sheet of ultra-thin glass in the second direction, and may be provided at a position corresponding to half of the first separation distance W1, for example, the middle of each sheet of ultra-thin glass in the first direction. In the embodiment, the sheets of ultra-thin glass may be supported by one lower support instead of a pair of lower supports.

The plate 110 at the second end may have multiple coupling grooves disposed to face the seventh coupling groove 141g and the eighth coupling groove 141h, respectively.

The supports 130 may include side supports for supporting the sides of each sheet of ultra-thin glass and lower supports for supporting the lower side of each sheet of ultra-thin glass.

The side supports may be formed in pairs disposed parallel to each other and respectively support both sides of each sheet of ultra-thin glass. The side supports may include a first side support 131, a second side support 132, a third side support 133, a fourth side support 134, a fifth side support 135, and a sixth side support 136. However, the disclosure is not limited thereto. For example, the third side support 133 and the fourth side support 134 or the fifth side support 135 and the sixth side support 136 may be omitted.

The lower supports may include a first lower support 137 and a second lower support 138. In an embodiment, a number of side supports and a number of lower supports may be six and two, respectively. However, the disclosure is not limited thereto, and the number of side supports and the number of lower supports may change.

The supports 130 may be provided in pairs. A pair of supports 130 may be disposed parallel to each other, and each end of each support 130 in the longitudinal direction may be respectively coupled to the plates 110 facing each other by the coupling members 140. For example, the first side support 131 and the second side support 132 may form a pair and may be disposed parallel to each other. The third side support 133 and the fourth side support 134 may form a pair and may be disposed parallel to each other. The fifth side support 135 and the sixth side support 136 may form a pair and may be disposed parallel to each other. In an embodiment, a cross section of each support 130 may have a circular shape, but the disclosure is not limited thereto.

The coupling members 140 may fix the supports 130 passing through the coupling grooves 141 to the plates 110. The coupling members 140 may correspond one-to-one to the coupling grooves 141. An end (or both ends) of each support 130 may have a screw thread and may be fixed to a coupling member 140. A mount (not illustrated) may be further disposed between the end of each support 130 and the coupling member 140.

In an embodiment, the coupling members 140 may include a first coupling member 140*a*, a second coupling member 140*b*, a third coupling member 140*c*, a fourth coupling member 140*d*, a fifth coupling member 140*e*, a sixth coupling member 140*f*, a seventh coupling member 140*g*, and an eighth coupling member 140*h*. For example, the first coupling member 140*a* may fix an end of the first side support 131 passing through the first through hole or coupling groove 141*a*, and the second coupling member 140*b* may fix an end of the second side support 132 through the second through hole or coupling groove 141*b*. The third coupling member 140*c* may fix an end of the third side support 133 passing through the third through hole or coupling groove 141*c*, and the fourth coupling member 140*d* may fix an end of the fourth side support 134 through the fourth through hole or coupling groove 141*d*. The fifth coupling member 140*e* may fix an end of the fifth side support 135 passing through the fifth through hole or coupling groove 141*e*, and the sixth coupling member 140*f* may fix an end of the sixth side support 136 through the sixth through hole or coupling groove 141*f*. The seventh coupling member 140*g* may fix an end of the first lower support 137 passing through the seventh through hole or coupling groove 141*g*, and the eighth coupling member 140*h* may fix an end of the second lower support 138 through the eighth through hole or coupling groove 141*h*.

Figure 7:
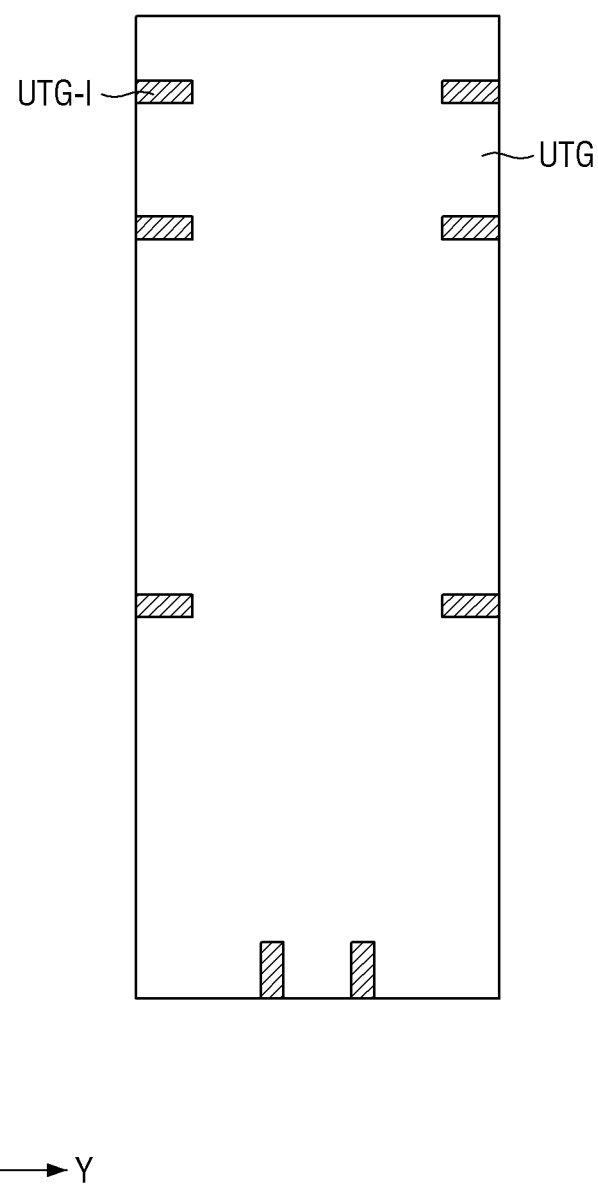
FIG. 7 is a front view of a sheet of ultra-thin glass according to an embodiment.

FIG. 7 is a front view of a sheet of ultra-thin glass UTG according to an embodiment.

Referring to FIG. 7, in case that the sheet of ultra-thin glass UTG according to the embodiment is loaded on the cassette, portions of sides and a lower side of the sheet of ultra-thin glass UTG may be inserted into mounting grooves 31 of the supports 130. The portions of the sides and lower side of the sheet of ultra-thin glass UTG inserted into the mounting grooves 31 may be referred to as insertion portions UTG-I.

Depending on the shape of the mounting grooves 31, dents may occur on the insertion portions UTG-I, or the sheet of ultra-thin glass UTG may get out of the mounting grooves 31 and stick to another sheet of ultra-thin glass UTG. For example, the insertion portions UTG-I formed at the lower side of the sheet of ultra-thin glass UTG may be more likely to have dents due to the weight of the sheet of ultra-thin glass UTG.

Figure 8:
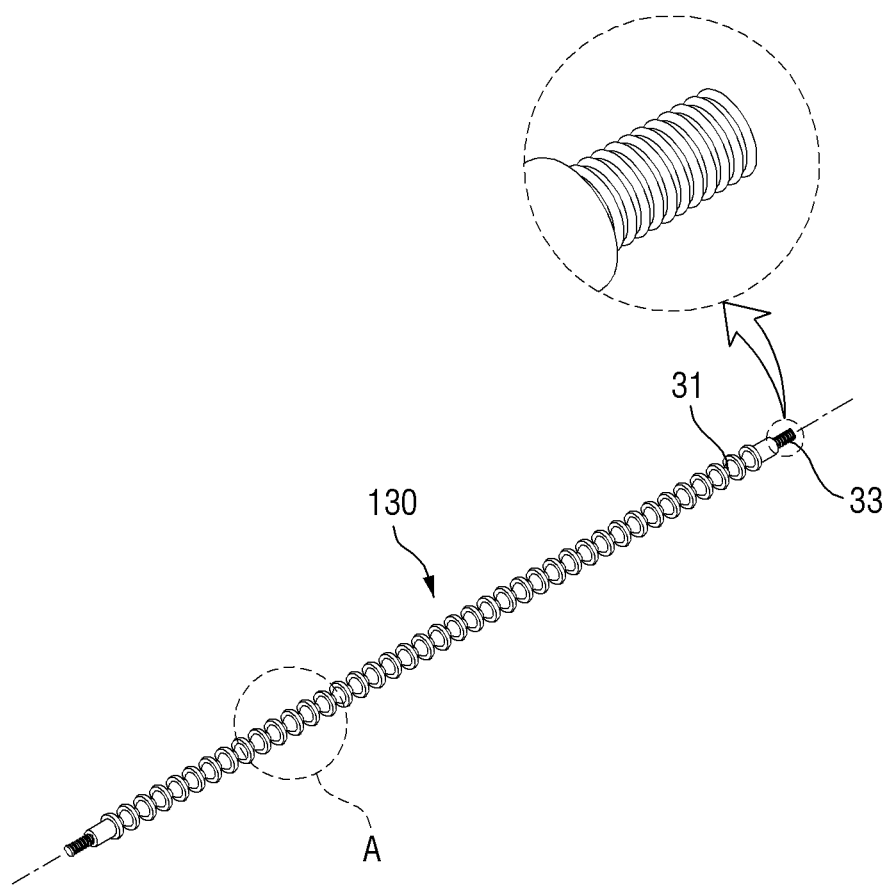
FIG. 8 is a perspective view of a support according to an embodiment.
Figure 9:
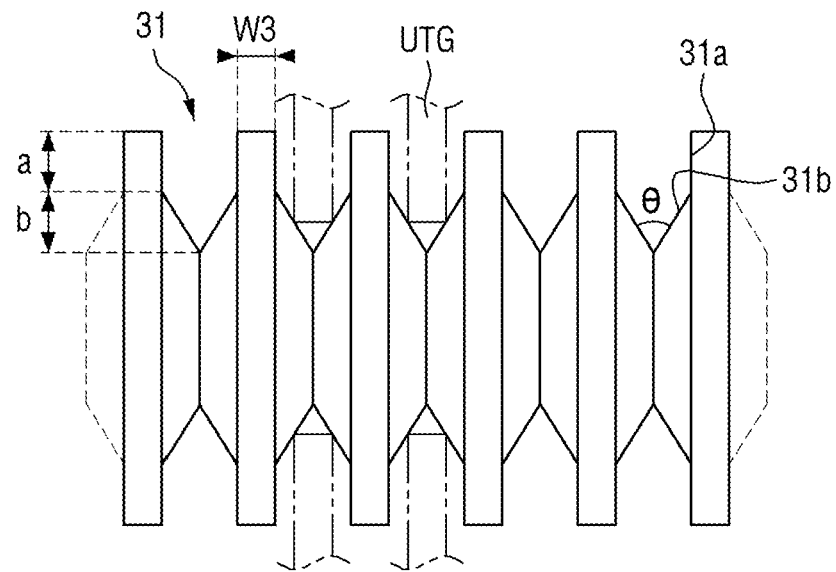
FIG. 9 is an enlarged side view of portion A of FIG. 8.
Figure 10:
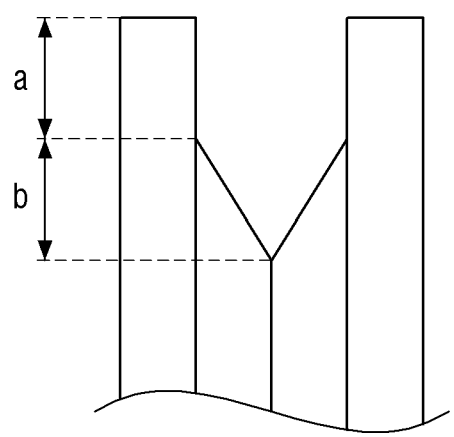
FIG. 10 is a schematic cross-sectional view of a mounting groove according to an embodiment.
Figure 11:
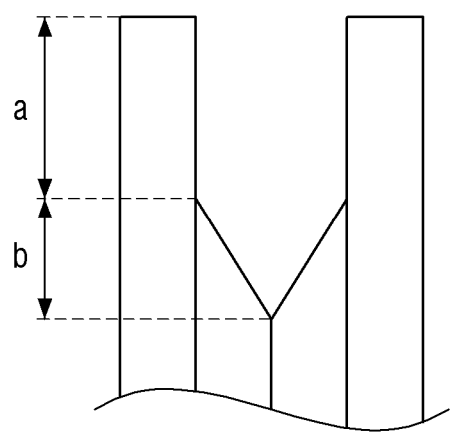
FIG. 11 is a schematic cross-sectional view of a mounting groove according to an embodiment.

FIG. 8 is a perspective view of a support 130 according to an embodiment. FIG. 9 is an enlarged side view of portion A of FIG. 8. FIG. 10 is a schematic cross-sectional view of a mounting groove 31 according to an embodiment. FIG. 11 is a schematic cross-sectional view of a mounting groove 31 according to an embodiment.

Referring to FIGS. 1, 3, 8 and 9, a male screw portion 33 having a screw thread may be formed at both ends of the support 130 so that the support 130 can be coupled to the coupling grooves 141 provided on the plates 110. The male screw portions 33 may pass through the coupling grooves 141 provided on the plates 110 and may be coupled to the coupling members 140. The coupling members 140 may be fixing nuts having a female screw portion. Although screw coupling has been described in the embodiment, the disclosure is not limited thereto, and various other coupling means such as fusion bonding may be implemented.

The support 130 may support sides or lower side of sheets of ultra-thin glass UTG. For stable support of the sheets of ultra-thin glass UTG, multiple mounting grooves 31 may be formed along the longitudinal direction. The mounting grooves 31 may be formed along a circumference of the support 130. However, the disclosure is not limited thereto, and the mounting grooves 31 may be formed only on some surfaces. The mounting grooves 31 may be continuously formed at regular intervals along the longitudinal direction of the support 130. Accordingly, the support 130 may support a number of sheets of ultra-thin glass UTG corresponding to the number of mounting grooves 31 formed.

The support 130 may support multiple sheets of ultra-thin glass UTG by the mounting grooves 31. The mounting grooves 31 formed on a pair of supports 130 disposed parallel to each other may be formed at positions corresponding to each other, and the mounting grooves 31 formed on supports 130 disposed in a same column may also be formed at positions corresponding to each other.

The mounting grooves 31 formed on side supports arranged parallel to each other may be formed at positions corresponding to each other. For example, mounting grooves 31-2 formed on the second side support 132 may be formed at positions corresponding to mounting grooves 31-1 formed on the first side support 131. In case that a sheet of ultra-thin glass is inserted into the cassette, a pair of the third side support 133 and the fourth side support 134 may receive the sheet of ultra-thin glass from a pair of the first side support 131 and the second side support 132. Therefore, mounting grooves 31-3 formed on the third side support 133 may be formed at positions corresponding to the mounting grooves 31-1 formed on the first side support 131, and mounting grooves 31-4 formed on the fourth side support 134 may be formed at positions corresponding to the mounting grooves 31-2 formed on the second side support 132. Therefore, the mounting grooves 31-4 formed on the fourth side support 134 may be disposed parallel to the mounting grooves 31-3 formed on the third side support 133.

Likewise, mounting grooves 31-5 formed on the fifth side support 135 may be formed at positions corresponding to the mounting grooves 31-3 formed on the third side support 133, and mounting grooves 31-6 formed on the sixth side support 136 may be formed at positions corresponding to the mounting grooves 31-4 formed on the fourth side support 134. Therefore, the mounting grooves 31-6 formed on the sixth side support 136 may be disposed parallel to the mounting grooves 31-5 formed on the fifth side support 135.

Mounting grooves formed on lower supports arranged parallel to each other may be formed at positions corresponding to each other.

Mounting grooves 31-7 formed on the first lower support 137 may be formed at positions corresponding to mounting grooves 31-8 formed on the second lower support 138 disposed parallel to the first lower support 137.

Referring to FIGS. 9 through 11, each of the mounting grooves 31 may include an inclined portion 31*b* formed to become narrower toward the middle, for example, toward the center of the corresponding mounting groove 31 and a straight portion 31*a* extending from the inclined portion 31*b* and having a constant width. For example, an inclined portion 31*b* may incline toward a middle of the corresponding mounting grooves 31.

The straight portion 31*a* may have a height a greater than a height b of the inclined portion 31*b*.

For example, the height a of the straight portion 31*a* and the height b of the inclined portion 31*b* may be the same as illustrated in FIG. 10, or the height a of the straight portion 31*a* may be greater than the height b of the inclined portion 31*b* as illustrated in FIG. 11. In case that the height a of the straight portion 31*a* is less than the height b of the inclined portion 31*b*, a sheet of ultra-thin glass UTG mounted on a mounting groove 31 may get out of the mounting groove 31 during cleaning. In case that the height a of the straight portion 31a is too high, the sheet of ultra-thin glass UTG and the straight portion 31a of the mounting groove 31 may contact each other when the sheet of ultra-thin glass UTG is inserted into or removed from the cassette. In consideration of this fact, a ratio of the height b of the inclined portion 31b to the height a of the straight portion 31a according to an embodiment may be in a range of about 3/7 to about 1.

Referring back to FIG. 9, the mounting grooves 31 may be spaced apart from each other by a same distance.

In case that sheets of ultra-thin glass are loaded and cleaned in the cassette, they may be readily bent in a cleaning solution due to their ultra-thin thickness. In case that the sheets of ultra-thin glass loaded on the cassette are completely immersed in and removed from the cleaning solution during the cleaning of the sheets of ultra-thin glass, a surface tension of the cleaning solution may act on the sheets of ultra-thin glass, and a distance between lower sides of adjacent sheets of ultra-thin glass may be reduced. Therefore, in case that a separation distance W3 between the mounting grooves 31 is too small, the sheets of ultra-thin glass UTG may stick together due to the surface tension of the cleaning solution. In consideration of this fact, the separation distance W3 between the mounting grooves 31 may be in the range of about 6 mm to about 10 mm. In case that the separation distance W3 between the mounting grooves 31 is 6 mm or less, the probability that the sheets of ultra-thin glass UTG stick together may increase. In case that the separation distance W3 between the mounting grooves 31 is 10 mm or more, the number of sheets of ultra-thin glass UTG that can be mounted decreases, thereby reducing the efficiency of the cleaning process.

A cross section of the inclined portion 31b may be formed in a V shape having a first angle θ, for example, may become narrower toward the middle of the mounting groove 31.

As the first angle of the inclined portion 31b decreases, the probability that dents will occur in the insertion portions UTG-I of sheets of ultra-thin glass UTG mounted on the mounting grooves 31 may increase. On the other hand, as the first angle of the inclined portion 31b increases, the probability that the sheets of ultra-thin glass UTG will get out of the mounting groove 31 during cleaning may increase. In consideration of this fact, the first angle according to an embodiment may be in a range of about 20 degrees to about 60 degrees.

In an embodiment, the cassette 100 may be used to apply sheets of ultra-thin glass loaded thereon to a cleaning process or a chemical process. In case that the cassette 100 is used in an ultrasonic cleaning process, vibrations generated due to the characteristics of the ultrasonic cleaning process may be transmitted to the sheets of ultra-thin glass loaded on the cassette 100. Accordingly, the sheets of ultra-thin glass may also vibrate with a certain amplitude. Due to this repeated shaking, the sheets of ultra-thin glass and the support 130 may collide and thus receive a slight impact. Eventually, the ultra-thin glass substrates may be damaged. Therefore, the support 130 may be made of a soft material with low hardness that can support the sheets of ultra-thin glass during the cleaning process but does not damage the sheets of ultra-thin glass. For example, the support 130 may be made of at least one of fluorine-based resins such as polytetrafluoroethylene (PTFE), perfluorinated acids (PFA), ethylene tetrafluoroethylene (ETFE), polyvinylidene fluoride (PVDF), polyvinyl fluoride (PVF), and polyetheretherketone (PEEK).

In an embodiment, the cassette 100 may be applied to an ion strengthening process performed at a temperature of greater than or equal to about 390° C. The support 130 of the cassette 100 applied to the ion strengthening process may be made of a material stable at high temperature. For example, the support 130 may be made of 304 or 316 series stainless steel.

Figure 12:
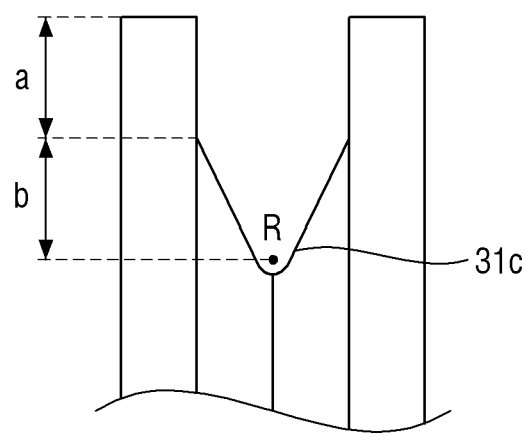
FIG. 12 is a schematic cross-sectional view of a mounting groove according to an embodiment.

FIG. 12 is a schematic cross-sectional view of a mounting groove 31 according to an embodiment.

The mounting groove 31 may include a round portion 31c having a curvature in a center of the mounting groove 31. The curvature may be about 0.5 R.

The mounting groove 31 may be same as the mounting grooves 31 illustrated in FIG. 9 except for the round portion 31c, and thus a redundant description thereof will be omitted.

Figure 13:
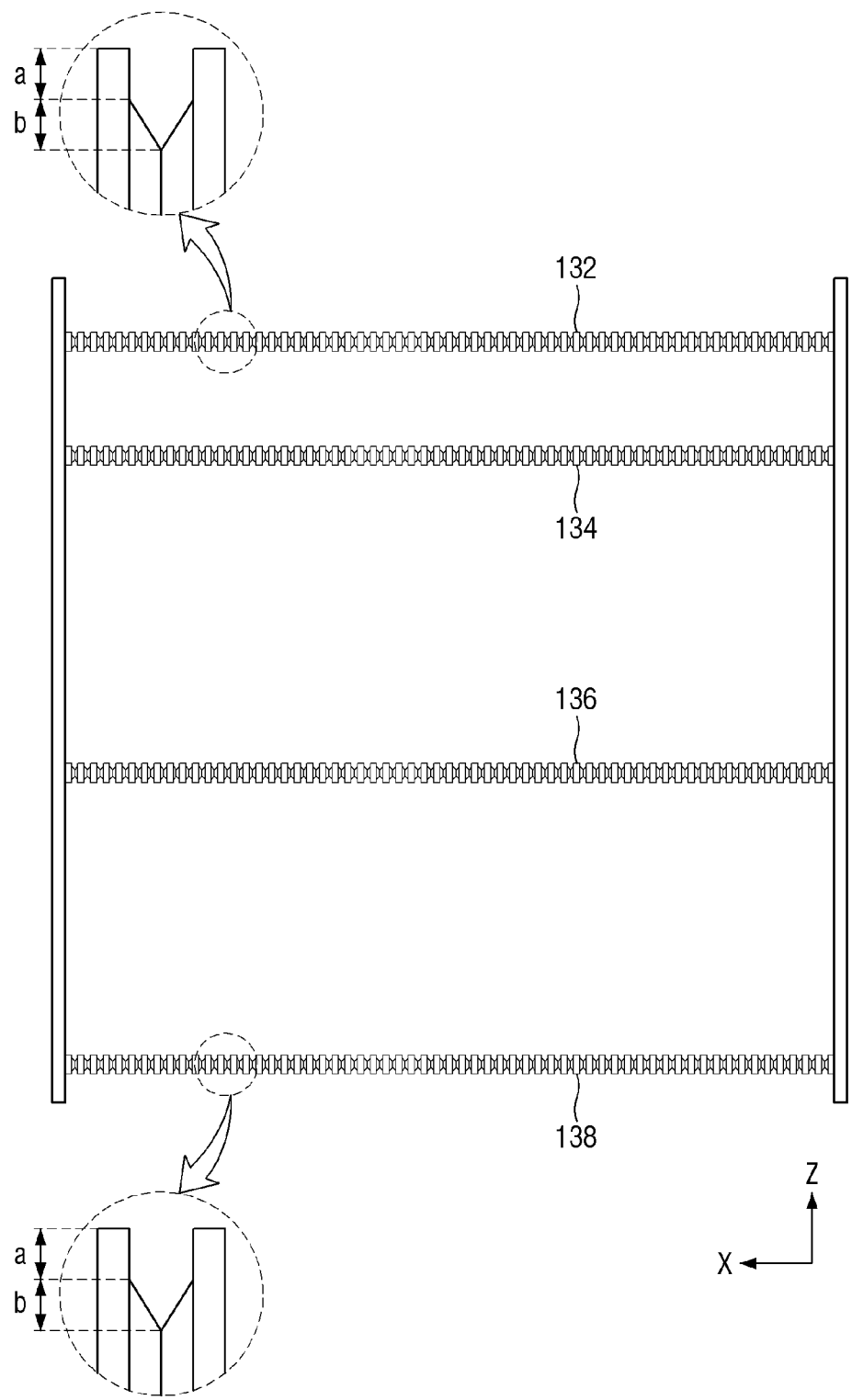
FIG. 13 is a side view of the cassette according to an embodiment.

FIG. 13 is a side view of the cassette according to an embodiment.

Referring to FIGS. 1 and 13, the shapes and dimensions of the mounting grooves 31 of the supports 130 may be the same regardless of the positions of the supports 130.

Figure 14:
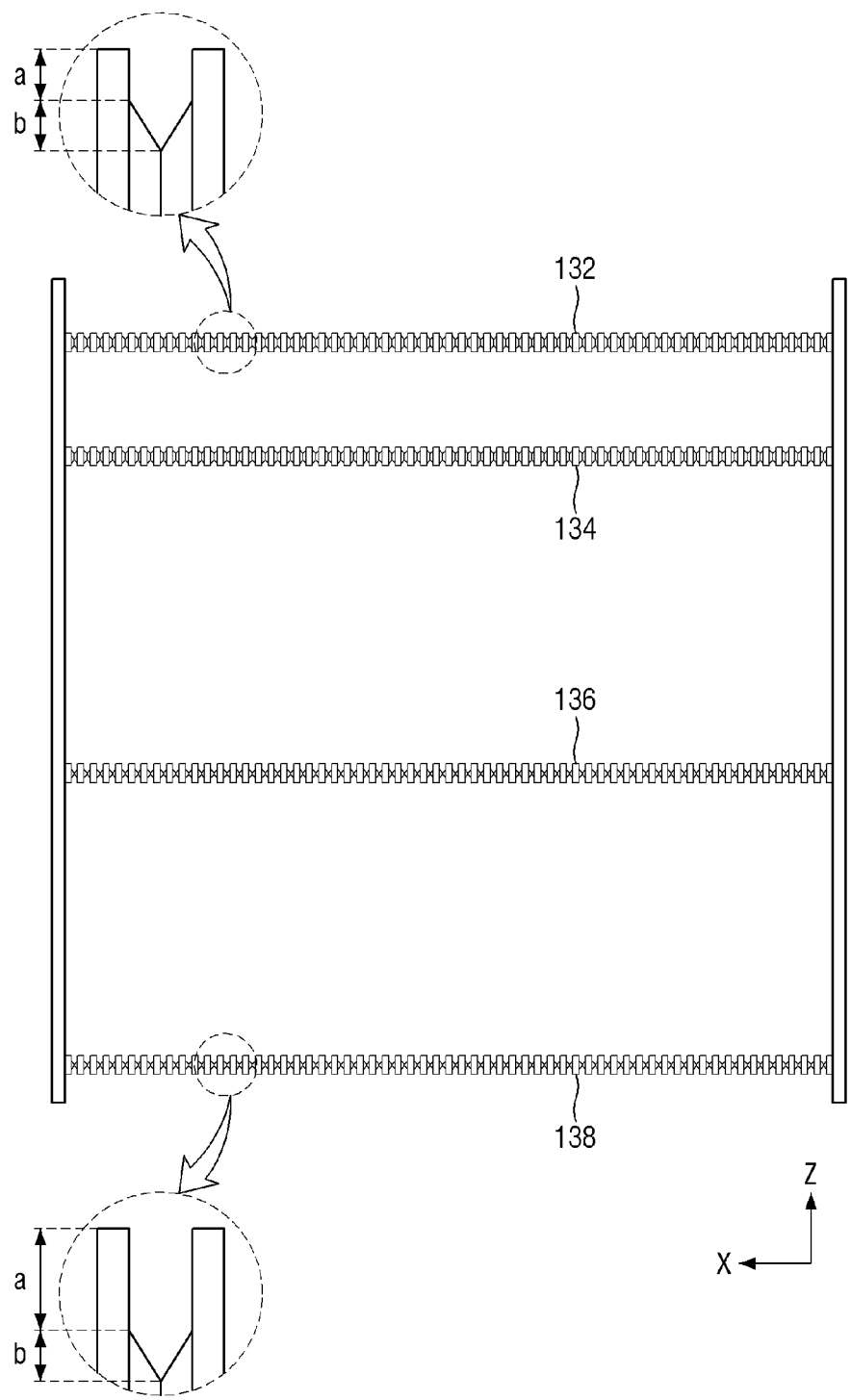
FIG. 14 is a side view of a cassette according to an embodiment.
Figure 15:
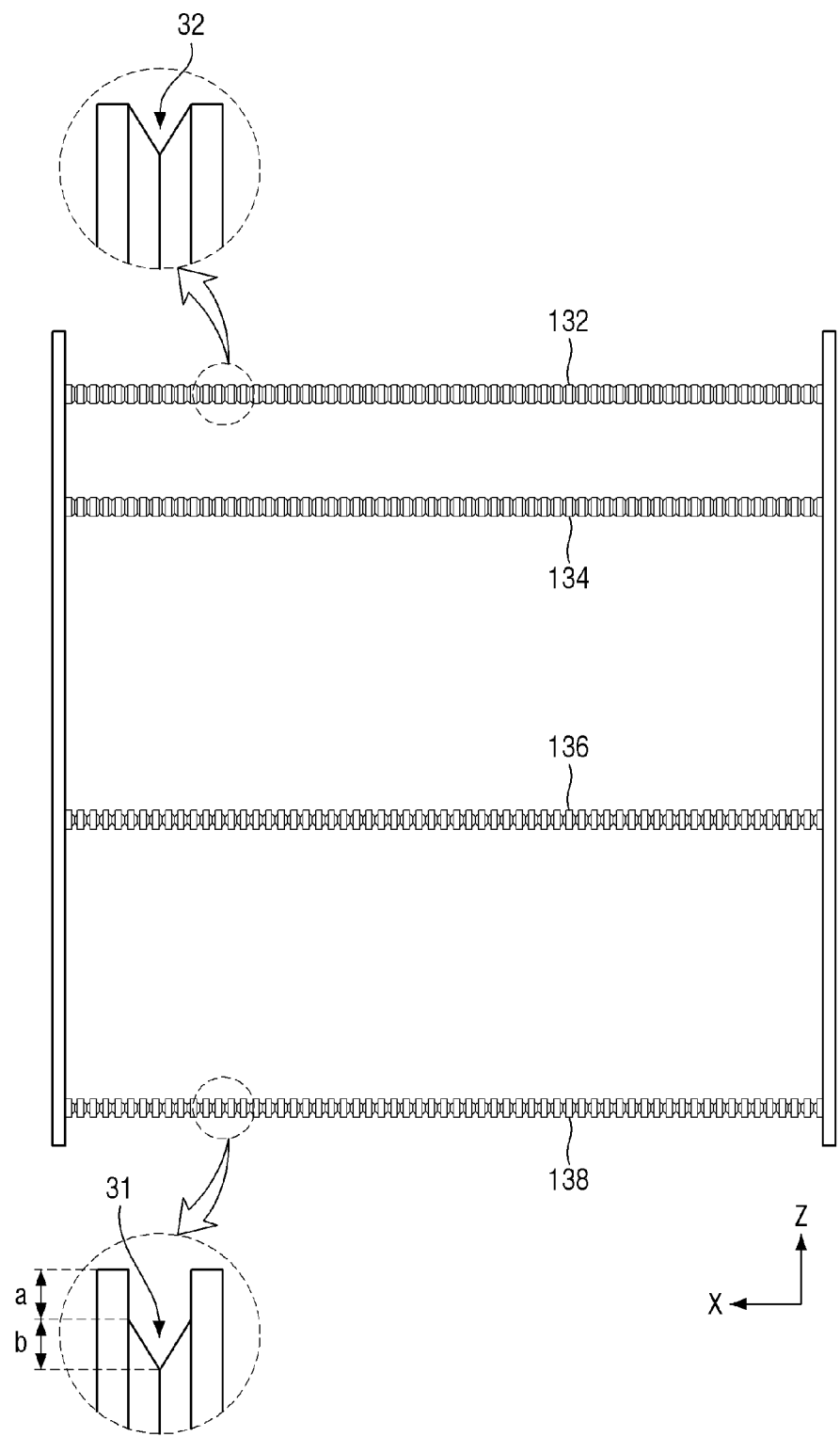
FIG. 15 is a side view of a cassette according to an embodiment.

FIG. 14 is a side view of a cassette according to an embodiment. FIG. 15 is a side view of a cassette according to an embodiment.

Referring to FIGS. 9, 14 and 15, the shapes and dimensions of mounting grooves 31 of multiple supports 130 may be different from each other according to the positions of the supports 130. Even in case that the shapes and dimensions of the mounting grooves 31 of the supports 130 are different, distances W3 between the mounting grooves 31 of the supports 130 provided in a cassette may be the same.

For example, referring to FIG. 14, a ratio of a height of an inclined portion to a height of a straight portion in each mounting groove 31 of a second lower support 138 provided on a lower side may be less than a ratio of the height of the inclined portion to the height of the straight portion in each mounting groove 31 of a second side support 132 provided on an upper side. For example, the ratio of the height of the inclined portion to the height of the straight portion of each mounting groove 31 of the second side support 132 provided on the upper side may be about 1, and the ratio of the height of the inclined portion to the height of the straight portion of each mounting groove 31 of the second lower support 138 provided on the lower side may be about 3/7.

Referring to FIG. 15, each mounting groove 32 of a second side support 132 provided on an upper side may have a V-shaped groove without a straight portion, and each mounting groove 31 of a second lower support 138 provided on a lower side may have a straight portion and an inclined portion as described with reference to FIG. 9.

A cross section of each of the mounting grooves 32 may be in a V shape having a second angle, and the second angle may be in a range of about 20 degrees to about 60 degrees. The mounting grooves 31 of the second lower support 138 provided on the lower side have been described with reference to FIG. 9, and thus a detailed description thereof will be omitted.

Figure 16:
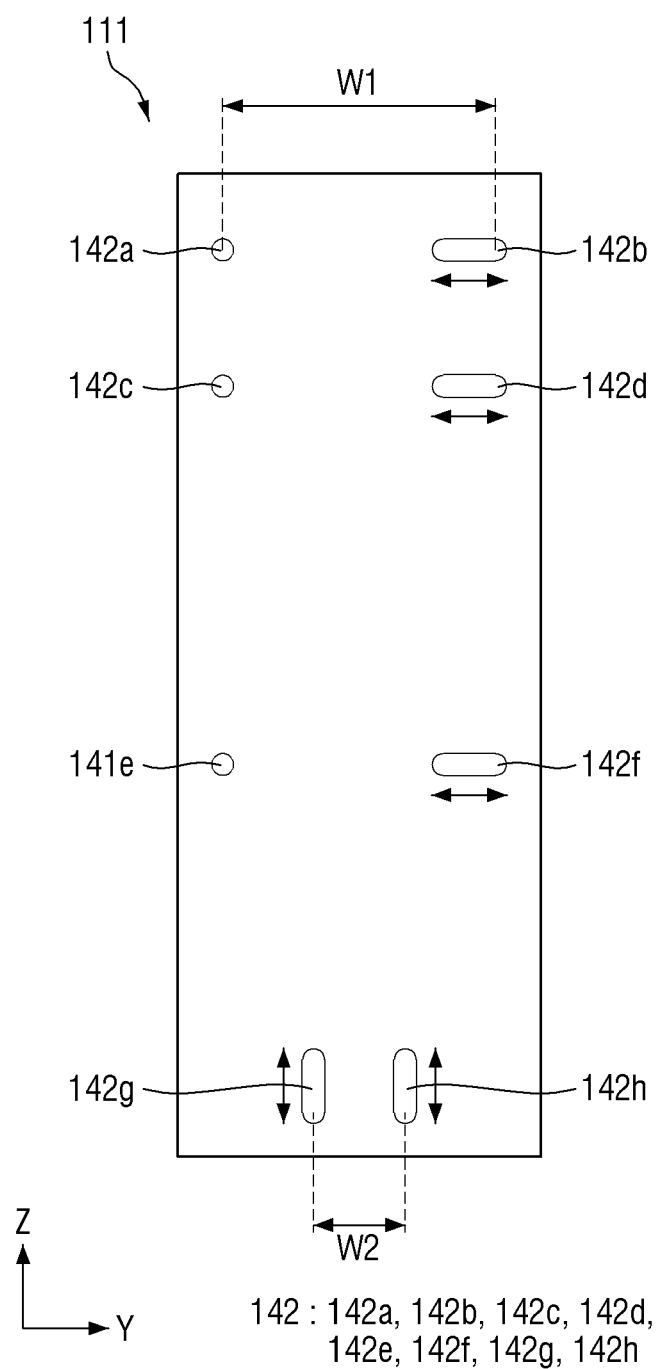
FIG. 16 is a front view of a plate according to an embodiment.
Figure 17:
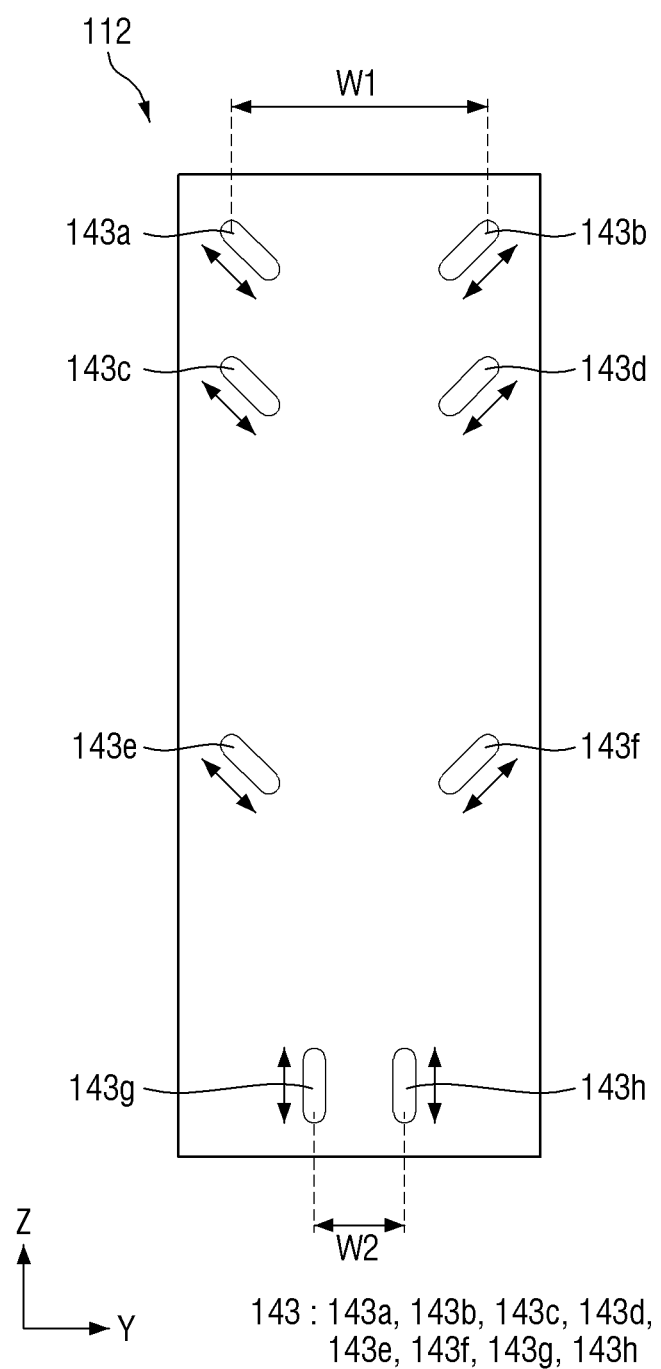
FIG. 17 is a front view of a plate according to an embodiment.

FIG. 16 is a front view of a plate according to an embodiment. FIG. 17 is a front view of a plate according to an embodiment.

Referring to FIGS. 16 and 17, some of the coupling grooves 142 and 143 provided on the plates 111 and 112 may be in the shape of long holes that allow supports to be moved in one direction.

Referring to FIG. 16, some of the coupling grooves 142 may be in the shape of long holes.

A second coupling groove 142b, a fourth coupling groove 142d, and a sixth coupling groove 142f may have a shape of horizontally long holes. A second side support 132, a fourth side support 134, and a sixth side support 136 may move along the long holes, for example, along the second coupling groove 142*b*, the fourth coupling groove 142*d*, and the sixth coupling groove 142*f*.

The second coupling groove 142*b*, the fourth coupling groove 142*d*, and the sixth coupling groove 142*f* may be formed in the shape of horizontally long holes. In case that the second side support 132, the fourth side support 134, and the sixth side support 136 are moved, a separation distance W1 may be adjusted. A scale or grooves for positioning may be provided on the long holes in order to move the second side support 132, the fourth side support 134, and the sixth side support 136 to the same vertical position.

Similarly, a seventh coupling groove 142*g* and an eighth coupling groove 142*h* may be formed in the shape of vertically long holes. Therefore, a first lower support 137 coupled to the seventh coupling groove 142*g* and a second lower support 138 coupled to the eighth coupling groove 142*h* may be slidable in a vertical direction.

In case that coupling grooves are formed in the shape of long holes, supports may move along the long holes. Therefore, the supports may support sheets of ultra-thin glass regardless of the size of the sheets of ultra-thin glass.

The cassettes according to the above-described embodiments on which sheets of ultra-thin glass are loaded may minimize damage to the sheets of ultra-thin glass during a process.

A scale or grooves for positioning may be provided on the long holes, for example, the seventh coupling groove 142*g* and the eighth coupling groove 142*h* in order to move the first lower support 137 and the second lower support 138 to the same horizontal position.

Referring to FIG. 17, the coupling grooves 143 may have shapes of long holes.

A first coupling groove 143*a* to a sixth coupling groove 143*f* may be formed in the shape of diagonally long holes. A first side support 131 to a sixth side support 136 may move along the long holes, for example, along the first coupling groove 143*a* to the sixth coupling groove 143*f*.

In case that the second side support 132, the fourth side support 134, and the sixth side support 136 are moved, a separation distance W1 may be adjusted. A scale or grooves for positioning may be provided on the long holes in order to move the first side support 131 to the sixth side support 136 to the same vertical position.

Similarly, a seventh coupling groove 143*g* and an eighth coupling groove 143*h* may be formed in the shape of vertically long holes. Therefore, a first lower support 137 coupled to the seventh coupling groove 143*g* and a second lower support 138 coupled to the eighth coupling groove 143*h* may be slidable in a vertical direction.

In case that coupling grooves are formed in the shape of long holes, supports may move along the long holes. Therefore, the supports may support sheets of ultra-thin glass regardless of the size of the sheets of ultra-thin glass.

The cassettes according to the above-described embodiments on which sheets of ultra-thin glass are loaded may minimize damage to the sheets of ultra-thin glass during a process.

A scale or grooves for positioning may be provided on the long holes, for example, the seventh coupling groove 143*g* and the eighth coupling groove 143*h* in order to move the first lower support 137 and the second lower support 138 to the same horizontal position.

A cassette according to an embodiment may prevent sheets of ultra-thin glass UTG from sticking to each other while minimizing dents that occur in case that the sheets of ultra-thin glass UTG are loaded on the cassette. Accordingly, the cassette according to the embodiment may minimize a defect rate, thus securing a high yield.

A cassette for ultra-thin glass according to an embodiment may prevent contact dents from being seen on sheets of ultra-thin glass in case that the sheets of ultra-thin glass are loaded on the cassette and may prevent the sheets of ultra-thin glass from sticking to each other during a cleaning process. Accordingly, the cassette according to the embodiment may minimize a defect rate, thus securing a high yield.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A cassette comprising:
   a pair of plates spaced apart from each other and facing each other; and
   a plurality of supports mounted between the pair of plates and comprising a plurality of mounting grooves that support sides of sheets of ultra-thin glass, wherein
   each of the plurality of mounting grooves comprises:
      an inclined portion inclined toward a middle of each of the plurality of mounting grooves; and
      a straight portion extending from the inclined portion and having a constant width in an axial direction of the plurality of supports,
   a height of the straight portion in a radial direction of the plurality of supports is equal to or greater than a height of the inclined portion in the radial direction, and
   a ratio of the height of the inclined portion to the height of the straight portion is in a range of about 3/7 to about 1.

2. The cassette of claim 1, wherein
   the inclined portion has a V shape having a first angle in a cross-sectional view, and
   the first angle is in a range of about 20 degrees to about 60 degrees.

3. The cassette of claim 1, wherein
   each of the pair of plates comprises coupling grooves, and
   the cassette further comprises coupling members for connecting the plurality of supports passing through the coupling grooves to the pair of plates.

4. The cassette of claim 1, wherein the plurality of mounting grooves are spaced apart from each other by a same distance.

5. The cassette of claim 4, wherein a distance between adjacent ones of the plurality of mounting grooves is in a range of about 6 mm to about 10 mm.

6. The cassette of claim 1, wherein each of the plurality of mounting grooves further comprises a round portion having a curvature in a center of the inclined portion.

7. The cassette of claim 1, wherein
   the plurality of supports comprise at least one pair of side supports disposed parallel to each other, and
   the at least one pair of side supports are spaced apart from each other by a first separation distance.

8. The cassette of claim 7, wherein
the plurality of supports further comprise a pair of lower supports disposed parallel to each other, and
the pair of lower supports are spaced apart from each other by a second separation distance.

9. The cassette of claim 1, wherein the plurality of supports are made of a fluorine-based resin.

10. The cassette of claim 1, wherein the plurality of supports are made of a stainless steel.

11. A cassette comprising:
a pair of plates spaced apart from each other and facing each other;
a first support mounted between the pair of plates and comprising a plurality of first mounting grooves that support first sides of sheets of ultra-thin glass; and
a second support mounted between the pair of plates and comprising a plurality of second mounting grooves that support second sides of the sheets of ultra-thin glass, wherein
each of the plurality of first mounting grooves comprises:
  a first inclined portion inclined toward a middle of the plurality of first mounting grooves; and
  a first straight portion extending from the first inclined portion and having a constant width in an axial direction of the first support,
the plurality of second mounting grooves and the plurality of first mounting grooves have different shapes or dimensions,
the first sides are lower sides of the sheets of ultra-thin glass,
the second sides are sides of the sheets of ultra-thin glass extending in a vertical direction,
each of the plurality of second mounting grooves comprises:
  a second inclined portion inclined toward a middle of the plurality of second mounting grooves; and
  a second straight portion extending from the second inclined portion and having a constant width in an axial direction of the second support, and
a height of the second straight portion in a radial direction of the second support is less than a height of the first straight portion in a radial direction of the first support.

12. The cassette of claim 11, wherein a height of the first straight portion in a radial direction of the first support is higher than a height of the first inclined portion in the radial direction.

13. The cassette of claim 12, wherein a ratio of the height of the first inclined portion to the height of the first straight portion is in a range of about 3/7 to about 1.

14. The cassette of claim 11, wherein each of the plurality of second mounting grooves is formed as a second inclined portion inclined toward a middle of the plurality of second mounting grooves.

15. The cassette of claim 11, wherein
the first inclined portion has a V shape having a first angle in a cross-sectional view, and
the first angle is in a range of about 20 degrees to about 60 degrees.

16. The cassette of claim 11, wherein
the second inclined portion has a V shape having a second angle in a cross-sectional view, and
the second angle is in a range of about 20 degrees to about 60 degrees.

17. The cassette of claim 11, wherein
the plurality of first mounting grooves are spaced apart from each other by a first distance,
the plurality of second mounting grooves are spaced apart from each other by a second distance, and
the first distance and the second distance are same.

18. The cassette of claim 17, wherein a distance between adjacent ones of the plurality of first mounting grooves is in a range of about 6 mm to about 10 mm.

* * * * *